United States Patent
Englund et al.

(10) Patent No.: US 9,526,087 B2
(45) Date of Patent: *Dec. 20, 2016

(54) METHOD AND APPARATUS FOR TRANSMITTING CSI ON THE PUSCH IN AN LTE SYSTEM

(71) Applicant: TELEFONAKTIEBOLAGET L M ERICSSON (PUBL), Stockholm (SE)

(72) Inventors: Eva Englund, Linkoping (SE); Erik Eriksson, Linkoping (SE); Kristina Jersenius, Linkoping (SE); George Jongren, Sundyberg (SE); Peter Moberg, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,412

(22) Filed: Apr. 18, 2014

(65) Prior Publication Data
US 2014/0211770 A1 Jul. 31, 2014

Related U.S. Application Data

(63) Continuation of application No. 12/935,331, filed as application No. PCT/SE2009/050316 on Mar. 26, 2009, now Pat. No. 8,743,801.
(Continued)

(51) Int. Cl.
*H04J 3/00* (2006.01)
*H04W 72/02* (2009.01)
(Continued)

(52) U.S. Cl.
CPC ............ *H04W 72/02* (2013.01); *H04L 1/0026* (2013.01); *H04L 1/0027* (2013.01);
(Continued)

(58) Field of Classification Search
CPC ...... H04W 72/00; H04W 72/02; H04W 48/08; H04L 5/00; H04L 5/0082
(Continued)

(56) References Cited

U.S. PATENT DOCUMENTS 8,059,632 B2 11/2011 Xu
8,743,801 B2 * 6/2014 Englund ............... H04L 1/0026
370/329
2008/0311919 A1 12/2008 Whinnett et al.

FOREIGN PATENT DOCUMENTS

WO WO 2009/088225 7/2009

OTHER PUBLICATIONS

3 RD Generation Partnership Project "UL Sounding Arrangement" 3GPP TSG RAN WG1 Meeting #50, R1-073642, Athens, Greece, Aug. 20-24, 2007.
(Continued)

*Primary Examiner* — Chi H Pham
*Assistant Examiner* — Alexander O Boakye (57) ABSTRACT

The present invention relates to allowing configuring CSI reporting (step S-224, 310) on radio resources that are allocated over a plurality of sub frames on Physical Uplink Shared Channel (PUSCH). Allocation of said radio resources (steps S-202, 404) can be performed by semi-persistent allocation or by using Transmission Time Interval (TTI) bundling. By using either semi-persistent scheduling or TTI-bundling as decided by an eNB (104, 204, 600) the UE (102, 202, 500) can be configured to report CSI (step S-224, 310) for a plurality of UL transmissions. By allocating radio resources by using semi-persistent scheduling, the signaling overhead, which can be substantial for dynamic scheduling of radio resources, decreases. By using TTI-bundling the coverage of the CSI-reports increases.

22 Claims, 3 Drawing Sheets

Related U.S. Application Data (60) Provisional application No. 61/040,839, filed on Mar. 31, 2008.

(51) Int. Cl.
*H04L 1/00* (2006.01)
*H04W 72/04* (2009.01)
*H04L 5/00* (2006.01)
*H04W 48/08* (2009.01)

(52) U.S. Cl.
CPC ....... *H04W 72/0413* (2013.01); *H04L 5/0053* (2013.01); *H04L 5/0082* (2013.01); *H04L 5/0094* (2013.01); *H04W 48/08* (2013.01)

(58) Field of Classification Search
USPC ............... 370/329, 328, 331, 351, 352, 336, 337,370/493, 392, 252, 350, 344, 330; 455/447, 67, 455/550; 375/267
See application file for complete search history.

(56) References Cited

OTHER PUBLICATIONS

3 RD Generation Partnership Project "PHICH Assignment for TDD and FDD E-UTRA" 3GPP TSG RAN1 #51bis, R1-080071, Sevilla Spain, Jan. 14-18, 2007.

3 RD Generation Partnership Project "PHICH Assignment for TDD and FDD E-UTRA" 3GPP TSG RAN1 #52, Sorrento, Italy, Feb. 11-15, 2008.

3GPP 3$^{rd}$ Generation Partnership Project: Technical Specification Group Radio Access Network; Evolved Universal Terrestrial Radio Access (E-UTRA); Physical Layer Procedures(Release 8). 3GPP TS 36.213 v8.2.0(Mar. 2008).

* cited by examiner

METHOD AND APPARATUS FOR TRANSMITTING CSI ON THE PUSCH IN AN LTE SYSTEM

PRIORITY CLAIM UNDER 35 U.S.C. 119(e)

This application is a continuation of U.S. Non-Provisional No. 12/935,331, filed Sep. 29, 2010, entitled "Method and Apparatus for Transmitting CSI on the PUSCH in an LTE System" which is incorporated by reference in its entirety. This application claims the benefit of PCT/SE09/50316, filed Mar. 26, 2009, entitled "Methods and Arrangements in a Telecommunications System," which claims the benefit of U.S. Provisional No. 61/040,839, filed Mar. 31, 2008, entitled "Method and Arrangement in a Telecommunications System."

TECHNICAL FIELD

The present invention relates in general to methods and arrangements in a telecommunications system, and in particular to methods and arrangements for configuring reporting of a channel state indicator periodically or repeatedly on a physical uplink shared channel in a wireless telecommunications system.

BACKGROUND

Technical Background and Existing Technology

The Long Term Evolution concept is being standardized under 3GPP. In LTE the downlink (DL) supports channel dependent scheduling in both the time and frequency domains, dependent on instantaneous DL channel conditions. Reference signals can for this reason be transmitted by the eNodeB base station to the User Equipment (UE), based upon which the UE can determine the downlink channel quality. The UEs can send Channel State Indication (CSI) reports back to the eNodeB, which reports can be utilized by a scheduler and a link adapter located in the eNodeB, for the allocation of resources and transmission information to the UE.

In 3GPP it has been agreed that there are two different methods of transmitting the Channel State Indicator (CSI), periodically on the physical uplink control channel (PUCCH), and a-periodically on the physical on the physical uplink shared channel (PUSCH) for data or periodically on PUSCH, see for example 3GPP TS 36.213 V8.5.0, "Physical layer procedures".

Different CSI formats are being used for PUCCH and PUSCH CSI reports, where the PUSCH reports comprises more frequency granular information and therefore requires more space. The formats are typically configured by higher layer signaling.

Through higher-layer signaling such as Radio Resource Control (RRC) signaling, the eNodeB can configure the UE to transmit CSI reports periodically on PUCCH. However, the size of a PUCCH CSI is very limited, in the order of 10 bits. Also, the PUCCH in LTE is used not only for CSI reports but also for scheduling requests (SRs) and Hybrid Automatic Repeat reQuest (HARQ) ACK/NACK feedback.

The LTE uplink (UL) is based on single-carrier modulation and uses frequency and time division multiple access principles (FDMA and TDMA). The single-carrier property of the LTE uplink makes it impossible for a UE to transmit on a physical control channel and a physical data channel in the same transmission-time-interval (TTI). Hence, if a UE is transmitting data on PUSCH and have a PUCCH CSI allocation in the same TTI, the CSI will also be sent on the physical data channel, that is the PUSCH. In this case the smaller PUCCH format is used, although transmission takes place on PUSCH. Whenever the CSI is transmitted on the physical data channel, PUSCH, it is multiplexed with data.

However, the CSI reporting on PUSCH allows for larger CSI reports than the CSI reporting on PUCCH. The a-periodic CSI reporting on PUSCH means that the eNodeB can indicate to the UE by using a poll bit in the uplink scheduling grant that a CSI report should be included in the uplink transmission. The uplink grant is transmitted on the physical downlink control channel (PDCCH).

There are two mechanisms in the standard where a grant can be applied to several sub-frames, semi-persistent scheduling and TTI bundling.

Semi-Persistent Scheduling

Fully dynamic scheduling allows for flexibility but it also leads to high signaling overhead as a grant needs to be signaled in each scheduling instance, for example for each Voice over Internet Protocol (VoIP) packet in case of VoIP. To limit the signaling load for sources with regular arrival rate a concept referred as semi-persistent scheduling has been agreed in 3GPP.

The underlying idea of semi-persistent scheduling is to assign resources using two methods that can complement each other. Resources may for instance partially be assigned through RRC and partially by using the PDCCH grants. For instance, the periodicity could be configured through RRC and the actual resources and timing of the resource allocation through a scheduling grant on the PDCCH addressed to the UE.

The resources used for semi-persistent scheduling need to be setup at the beginning of a connection. For VoIP, a reconfiguration of the resource should be possible at least once per talk burst in order to start using the semi-persistent resource when the talk burst starts. There is moreover a need to revoke the semi persistent resource at the end of the talk burst to avoid collisions with dynamically scheduled resources, which may either be done explicitly or via a predefined rule, for instance that a given number of unused resources leads to revoking of the grant.

The requirement for VoIP is therefore that the resources should be reconfigured 1-2 times per talk burst, which corresponds to 1-2 reconfigurations/s with a talk burst duration of 1 s.

The method how to assign resources is now agreed in 3GPP. Configuration and reconfiguration of semi-persistent radio resources is performed by using PDCCH.

Usage of PDCCH for reconfiguring the semi-persistent resources may also involve RRC configuration setup for providing periodicity information to the UE.

Using PDCCH can also support the usage of several resources with blind decoding by applying the existing PDCCH format with a special Radio Network Temporary Identifier (RNTI). Some code points can however be reserved to decrease misdetection probability.

By using one or several additional Radio Network Temporary Identifiers (RNTIs), and letting each RNTI and its position when communicated on an out-band channel, indicate a particular scheduling method, different scheduling methods are applicable depending on which of the RNTIs is used in the scheduling, and where the RNTI is being communicated.

TTI Bundling

Another situation where a UE may be assigned resources which are valid longer than a single sub frame is called TTI bundling or autonomous retransmissions.

The underlying idea is to improve coverage by allowing the UE to autonomously transmit several transmissions attempts without awaiting the HARQ ACK/NACK. The purpose is either to limit the delay due to waiting for HARQ feedback or to avoid the NACK-to-ACK errors.

In 3GPP one TTI bundling concept has so far been proposed. By transmitting different redundancy versions consecutively it is ensured that the feedback response can be obtained without large HARQ Round Trip Time (RTT) increase.

The configuration for TTI bundling is enabled by configuring the UE by radio resource control (RRC) for normal operation or TTI bundling. When TTI bundling is applied, the number of TTIs that are bundled is four. Other ways could be to use PDCCH assignment similar to what is considered for semi-persistent scheduling described previously.

Existing solutions for reporting CQI are periodic CQI reporting on PUCCH and a-periodic reporting on PUSCH.

For instance CSI reporting on PUCCH suffers from the low load requirement of PUCCH being about 20% of the capacity that the code-division scheme is able to support. Out of 6 possible CSI transmissions per TTI, only 1-2 of those can in practice be used. In addition, the PUCCH channel only allows CSI reporting using small formats that are not well suited for frequency selective channel dependent scheduling. By explicitly reporting CSI a-periodically on PUSCH, large formats that are well suited for frequency selective channel dependent scheduling, may be obtained. However, a-periodic CSI reporting on PUSCH may require an increased amount of radio resource acknowledgements in the form of scheduling grant signaling on PDCCH.

SUMMARY

An object of the present invention is to provide methods and network nodes for allowing CSI reporting on Physical Uplink Shared Channel (PUSCH) with a low amount of overhead signaling, as compared to dynamic scheduling of resources.

According to an aspect of the present invention, there is provided a method in a base station for configuring reporting Channel Status Indicator, CSI, of a User Equipment, UE, on a Physical Uplink Shared Channel, PUSCH. This method comprises the steps of allocating uplink radio resources spanning over at least two sub frames to the UE by using an allocation method, providing information of the resource allocation to the UE, and providing at least an indication to the UE of a request for reporting CSI on PUSCH in at least one UL transmission for which the allocation is valid.

The allocation method within the method in a base station for configuring reporting Channel Status Indicator, may comprise allocating uplink radio resources that are repeated periodically in time, or allocating uplink radio resources that are repeated consecutively in time.

The allocation method of uplink radio resources within the method in a base station for configuring reporting Channel Status Indicator, may comprise semi-persistent scheduling or Transmission Time Interval, TTI, bundling.

The step of providing information of the allocation method within the method in a base station for configuring reporting Channel Status Indicator, may further comprise sending a UL resource grant message on the Physical Downlink Control Channel, PDCCH.

The step of providing at least an indication of a request for reporting CSI within the method in a base station for configuring reporting Channel Status Indicator, may further comprise configuring the UE via Radio Resource Control, RRC, indicating how CSI is to be reported.

The step of allocating uplink radio resources within the method in a base station for configuring reporting Channel Status Indicator, may further comprise allocating UL radio resources in blocks of plural consecutive sub frames or allocating UL radio resources periodically in plural non-consecutive sub frames.

The step of reporting CSI within the method in a base station for configuring reporting Channel Status Indicator, may further comprise reporting an updated CSI for one of: —each semi-persistent UL transmission of a granted periodic allocation, —a configured subset of semi-persistent UL transmissions of a granted periodic allocation, and —a static subset of semi-persistent UL transmissions of a granted periodic allocation.

The step of reporting CSI within the method in a base station for configuring reporting Channel Status Indicator, may further comprise repeating reporting the first CSI for one of: —all transmissions, —a configured subset of the transmissions, and —a static subset of the transmissions, in the case of a TTI bundling resource allocation.

The method in a base station for configuring reporting Channel Status Indicator, may further comprise obtaining reporting CSI from the UE on the Physical Uplink Shared Channel, PUSCH, in at least one UL transmission for which the UL resource allocation is valid.

According to a second aspect of the present invention, there is provided a base station for configuring reporting Channel Status Indicator, CSI, related to a UE, being adapted to be connected in a telecommunications system. The base station comprises a scheduling unit that is adapted to allocate UL radio resources spanning over at least two sub frames to the UE, by using an allocation method. The base station also comprises a configuration unit that is adapted to determine configuration of a UE to report CSI on PUSCH, and a transceiving unit that is adapted to transmit at least an indication of the determined configuration, to the UE.

The scheduling unit of the base station may be adapted to use semi-persistent scheduling or Transmission Time Interval, TTI bundling, for the allocation of said resources.

The configuration unit of the base station may further be adapted to configure the UE via Radio Resource Control, RRC. The transmitting unit of the base station may then further be adapted to transmit information of the request for reporting CSI, wherein said information of the request for reporting CSI indicates how CSI is to be reported by the UE.

The scheduling unit of the base station may further be adapted to schedule UL radio resources in blocks of plural consecutive sub frames or schedule UL radio resources periodically in plural non-consecutive sub frames.

According to a second aspect of the present invention, there is provided a method in a User Equipment, UE for enabling providing reporting Channel Status Indicator, CSI, on a Physical Uplink Shared Channel, PUSCH, to a base station. The method comprises the steps of obtaining information of a resource allocation from the base station, for which the radio resources span over at least two sub frames, obtaining at least an indication of a request for reporting CSI reporting on PUSCH in at least one transmission for which the allocation is valid, and reporting CSI on PUSCH in at least one transmission for which the allocation is valid.

The method in a User Equipment, UE for enabling providing reporting Channel Status Indicator, CSI may further comprise determining the CSI of radio resources based on the request, or said at least indication thereof, for reporting CSI.

The method in a User Equipment, UE for enabling providing reporting Channel Status Indicator, CSI may further comprise determining how to report CSI based on the information of a resource allocation and the at least an indication of a request for reporting CSI on PUSCH, as obtained from the base station.

According to a second aspect of the present invention, there is provided a user equipment, UE for providing reporting Channel Status Indicator, CSI, on a physical uplink data channel. This UE comprises a transceiving unit adapted to receive at least an indication of a request for reporting CSI on PUSCH, and a channel status determining unit, adapted to determine the CSI of radio resources, wherein the transceiving unit further is adapted to transmit a CSI report on the Physical Uplink Shared Channel, PUSCH to the base station.

The transceiving unit of the user equipment, UE for providing reporting Channel Status Indicator, CSI, on a physical uplink data channel, may further be adapted to receive information from the base station on how to provide CSI reporting on PUSCH.

The transceiving unit of the user equipment, UE for providing reporting Channel Status Indicator, CSI, on a physical uplink data channel, may further be adapted to receive information of an allocation method from the base station, for which the radio resources span over at least two sub frames.

At least some of the embodiments of the present invention have the advantage that the load on the Physical Uplink Control Channel (PUCCH) may be lowered by reporting CSI periodically on PUSCH instead of reporting CSI periodically on PUCCH.

Similarly, the amount of grant signaling on the Physical Downlink Control Channel (PDCCH) is reduced.

An increased coverage for PUSCH CSI reports is obtained in the case of resource allocation through TTI bundling.

BRIEF DESCRIPTION OF DRAWINGS

In order to explain advantages and features of the present invention herein in more detail a few embodiments will be described below, where references are made to the accompanying drawings, for which

ABBREVIATIONS

ACK Acknowledgement
ARQ Automatic Repeat reQuest
CSI Channel State Indicator
CQI Channel Quality Indicator
DL Downlink
eNB eNodeB
eNodeB Enhanced NodeB
FDMA Frequency Division Multiple Access
HARQ Hybrid ARQ
MAC Medium Access Control
NACK Negative Acknowledgement
OFDM Orthogonal Frequency Division Multiplexing
PDCCH Physical Downlink Control Channel
PMI Precoding Matrix Indicator
PUCCH Physical Uplink Control Channel
PUSCH Physical Uplink Shared Channel
RI Rank Indicator
RNTI Radio Network Temporary Identifier
RRC Radio Resource Control
SC-FDMA Single Carrier FDMA
SR Scheduling Request
TDMA Time Division Multiple Access
TTI Transmission Time Interval
UE User Equipment
UL Uplink

DETAILED DESCRIPTION

As mentioned earlier there are drawbacks with the existing ways for the UE to report CSI to the eNB base station.

One way of reducing the signaling overhead may be to configure periodic CSI reporting for PUSCH, which could be implemented by introducing novel mechanisms. However, by introducing such mechanisms the complexity for CSI reporting would increase.

Moreover, achieving a sufficient coverage for the CSI report on PUSCH can be problematic. Without using Hybrid Automatic Repeat reQuest (HARQ) transmissions of the CSI report on PUSCH, the coverage of the CSI reports may be limited at least as often as data transmissions are sent on PUSCH.

Limiting the overhead signaling for the allocation of radio resources for CSI reporting may be achieved by allocating radio resources that are valid in several sub frames.

In brief, the present invention concerns requesting reporting of CSI for UL radio resource allocations that are valid for several sub-frames.

For instance, if the UE receives an UL resource allocation that is valid for more than one sub-frame including a CSI request, a CSI report is included in all transmissions, a configured subset or a static subset of all transmissions for which the allocation is valid. This means that the CSI reporting on PUSCH may be implemented using an existing semi-persistent scheduling mechanism. In the semi-persistent allocation the base station, that is eNodeB, may include information indicating whether a CSI report should be included in the semi-persistently scheduled transmissions or not. The semi-persistent allocation, including the CSI information, is typically revealed on PDCCH.

In semi-persistent scheduling radio resources are allocated periodically by allocating non-consecutive sub frames periodically in consecutive radio frames. The CSI reporting can hence be performed periodically for PUSCH by using semi-persistent scheduling, according to some embodiments of the present invention.

As described above, limiting the overhead signaling for the allocation of radio resources for CSI reporting can be achieved by allocating radio resources that are valid in several sub frames. Allocation of radio resources over several sub frames may alternatively be achieved by using TTI-bundling, by which method an a-periodic reporting of CSI for PUSCH can be provided, according to some embodiments of the present invention.

The eNB can indicate in a UL scheduling grant message weather or not a CSI should be included in all, or a configured subset of, TTI bundled UL transmissions.

Similar to the semi-persistent allocation method as, the TTI bundling allocation method including the CSI information may be communicated to the UE over the PDCCH channel.

As pointed out earlier allocation of radio resources spanning over several sub frames has the advantage that the signaling overhead decreases as compared to the signaling required for, for instance, dynamic resource scheduling.

In the following some embodiments of the present invention will be described with reference to the accompanying figures.

Figure 1:
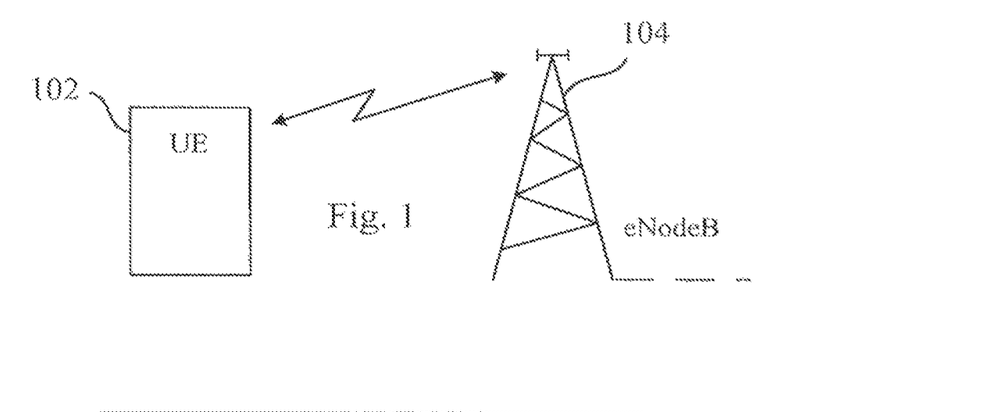
FIG. 1 illustrates communicating network nodes of a wireless communication system.

FIG. 1 illustrates two network nodes of a wireless telecommunication system, in the form of a UE 102 and a base station, as exemplified by an enhanced Node-B (eNB) 104, wherein said UE 102 and said base station 104 are adapted to perform UL and DL transmissions, respectively.

Figure 2:
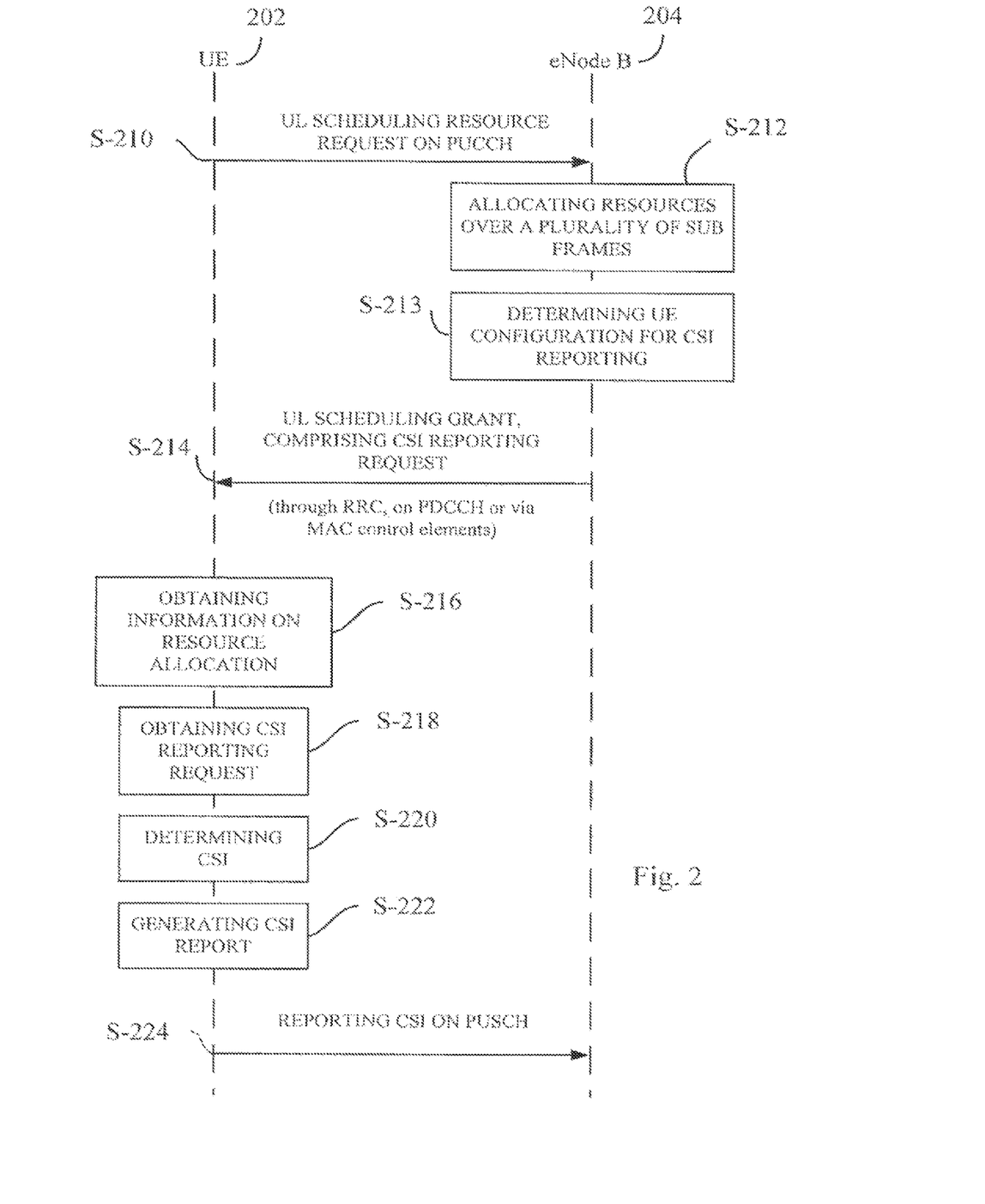
FIG. 2 illustrates a basic signaling scheme according to some embodiments of the present invention.

Reference will further also be made to FIG. 2, illustrating a basic signaling scheme for signaling between said UE 202 and eNB 204, by the use of which some embodiments of the present invention will be described in more detail.

One basic principle of the LTE radio access is that shared-channel transmission is utilized, which implies that time-frequency resources are shared between users.

In the case the UE 202 has data to be transmitted to the eNB 204, the UE 202 needs to obtain a scheduling grant that is valid before transmitting the data to the eNB 204.

Accordingly, the UE can request radio resources by transmitting a UL scheduling resource request to the eNB. In FIG. 2 this step is illustrated in step S-210. This UL scheduling resource request is transmitted on the Physical Uplink Control Channel, PUCCH for the reason that this physical channel is the channel used for requesting radio resources enabling transmitting uplink data.

Having received an UL scheduling resource request by the eNB 204, said node may allocate radio resources over a plurality of sub frames in step S-212, based on the received request in step S-210. As mentioned earlier, it is an advantage to allocate resources valid over a plurality of sub frames since signaling overhead per se is decreased as compared to allocating radio resources by dynamically scheduling the radio resources.

As mentioned above, one example of allocating radio resources over several sub frames is to allocate them by using semi-persistent scheduling by which non-consecutive sub frames can be allocated periodically. For each consecutive radio frame the radio resource is allocated periodically.

Another example of allocating resources over several sub frames is to apply Time Transmission Interval (TTI) bundling, by which consecutive sub frames are allocated a-periodically.

For both semi-persistent scheduling and TTI bundling, the resource allocation method comprises a possibility to request for including a CSI report in the UL transmissions for which the allocation is valid.

Dependent on the type of resource allocation the requested CSI report may be either a repetition of the first report or a new report. In the case of a semi-persistent allocation a new CSI report is transmitted for each UL transmission, or a configured subset of all. In the case of a TTI bundling allocation the first requested CSI report is repeated in all UL transmissions, or a configured subset thereof.

Having allocated radio resources valid over a plurality of sub frames in step S-212, the following step may be to determine the UE configuration for CSI reporting in step S-213.

Thereafter the eNB 204 may transmit a UL scheduling grant to the UE 202 in step S-214. According to some embodiments of the present invention, the request for reporting CSI by the UE can be comprised in the UL scheduling grant. This CSI reporting may be requested by means of a channel-state request flag included in the UL scheduling request.

In the following, a few examples of different resource allocation methods are considered.

The UL scheduling grant may thus be communicated to the UE on the Physical Downlink Control Channel (PDCCH). The configuration information for the allocation method may also be communicated on the PDCCH channel.

According to at least some embodiments of the present invention, the existing format on PDCCH with a special Radio Network Temporary Identifier (RNTI) may be used.

According to some alternative embodiments wherein the RRC is used for the allocation method, the periodic CSI reporting on PUSCH can be configured in two ways, a first and a second way.

In the first way, the actual multi TTI allocation is configured to comprise the CSI. This may thus be achieved by semi-persistently scheduling resources on PUSCH and indicate that CSI should be included in all semi-persistently scheduled transmissions.

In the second way, a PUCCH CSI allocation is configured to coincide with the configured semi-persistently scheduled resource on PUSCH. By using the second way, a small PUCCH type of report, supported by the 3GPP standard, or a large PUSCH type report can be sent, dependent on the configuration. The second way may be performed independent of any persistent allocation methods.

As mentioned earlier, at least some embodiments of the present invention provide the advantage of lowering the load on the Physical Uplink Control Channel (PUCCH) and reducing the amount of grant signaling on the Physical Downlink Control Channel (PDCCH). Moreover, in the case of resource allocation through TTI bundling, an increased coverage for PUSCH CSI reports can also be achieved.

Returning to the signaling scheme in FIG. 2, it is illustrated in step S-216 the step of obtaining information on the resource allocation from the eNB. The UE 202 can also obtain information comprising a CSI reporting request or at least an indication thereof in step S-218.

Having obtained a CSI reporting request by the UE, the actual CSI value is now determined by the UE, which is schematically illustrated in step S-220. Based on the determined CSI, the UE 202 may generate a CSI report in step S-222. Having generated a CSI report by the UE, the CSI report may then be reported by the UE 202 to the eNB 204, in step S-224. According to some embodiments of the present invention, this may be performed by reporting CSI on PUSCH.

The eNB can thus receive a CSI report in which the UE recommends a rank by using a Rank Indicator (RI), a Precoding Matrix Indicator (PMI) and a Modulation and Coding Scheme (MCS). The eNB may then choose to either follow the rank and PMI recommendations or to override them. The MCS, as indicated by a Channel Quality Indicator (CQI) is always explicitly signaled.

In the following, method steps of both the method in a UE as well as the method to be executed by an eNB are presented with reference alternately to the flowchart of FIG. 3 and to the flow-chart of FIG. 4, respectively.

The method to be executed in a UE may start by transmitting the UL scheduling resource request on PUCCH to the eNB, in step 302. This method step corresponds to the signaling step S-210 of the signal scheme of FIG. 2, as presented above.

Figure 4:
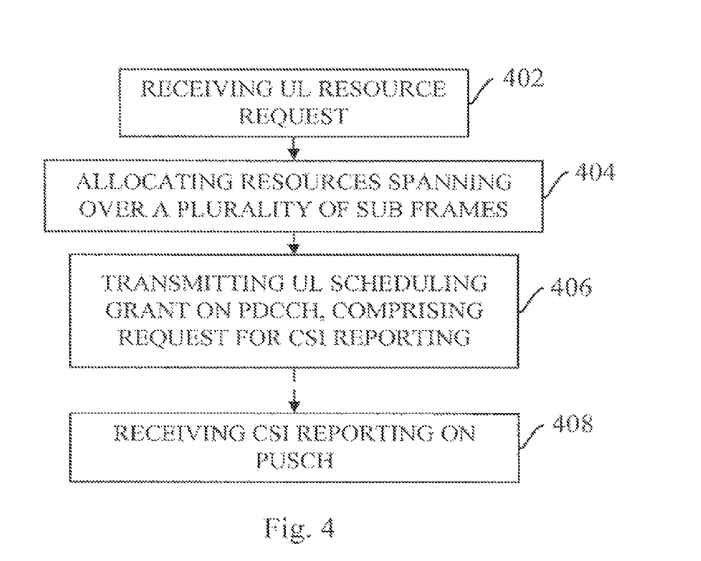

Transmitting a UL scheduling resource request by the UE in step 302 also corresponds to the step of receiving the UL scheduling resource request by the eNB in step 402, as illustrated in FIG. 4.

Having received the UL scheduling resource request, the eNB may allocate radio resources that are valid over at least two sub frames in step 404. According to some embodiments of the present invention, the eNB may allocate radio resources in step 404, which are valid over a plurality of sub frames.

As mentioned above one example of an allocation method that allocates radio resources spanning over at least two sub frames is the semi-persistent scheduling method, which periodically allocates non-consecutive sub frames.

Similarly, as mentioned above, a second example of an allocation method by which several sub frames can be allocated is the Transmission Time Interval, TTI, bundling method, which allocates block of consecutive sub-frames a-periodically. TTI-bundling may be called Autonomous Retransmission.

In the case of allocating radio resources spanning over multi sub frames, such as for semi-persistent scheduling method and for TTI-bundling, CSI reporting has an important role to deliver feedback to the eNB about the DL shared channel.

Thereafter, the eNB may transmit a UL scheduling grant to the UE in step 406. According to some embodiments of the present invention, this UL scheduling grant comprises the request for CSI reporting addressed to the UE.

The UL scheduling grant including the request for CSI reporting can be communicated to the UE on the Physical Downlink Control Channel (PDCCH).

Configuration information for the UE may be forwarded to the UE through the Radio Resource Control (RRC).

Figure 3:
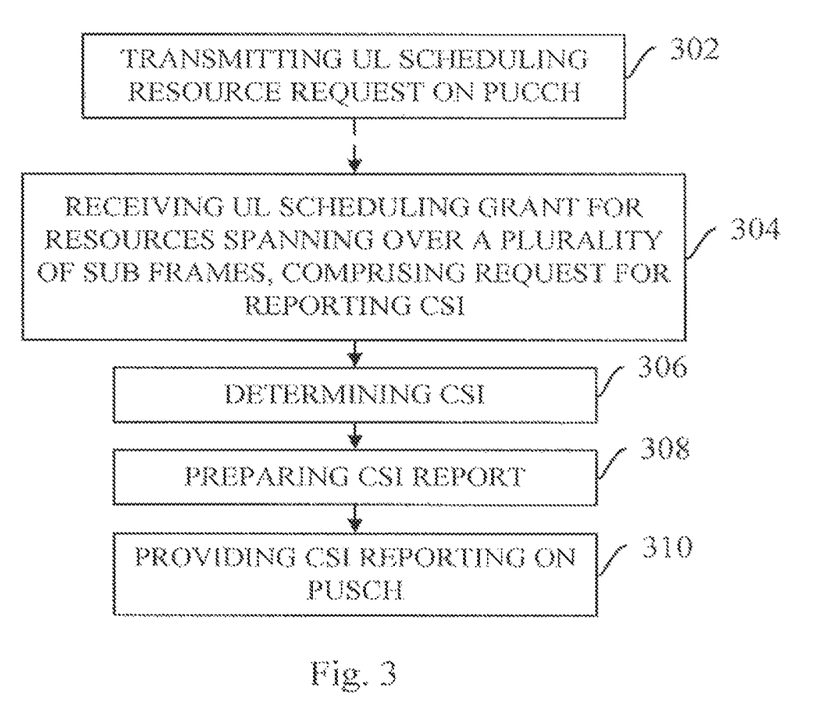
FIGS. 3 and 4 illustrate flow-charts of method steps according to some embodiments of the present invention.

Returning to the flow-chart of FIG. 3 presenting method step of the UE, it is illustrated in step 304 receiving the UL scheduling grant for resources spanning over a plurality of sub frames, wherein the UL scheduling grant may comprise the request for CSI reporting.

After the UE has received the request for CSI reporting in step 304, the UE can determine the CSI in step 306. Having determined the CSI in step 306, the CSI report can be prepared by the UE in step 308.

In the case of a semi-persistent scheduling or radio resources non-consecutive sub frames are allocated periodically. In this case the CSI report is updated for each UL transmission or at least for a configured or static sub-set of the UL transmissions.

In the case of TTI-bundling allocation, the first CSI report of the block of consecutive sub frames is repeated in all UL transmissions or at least in a configured subset of all UL transmissions.

Having prepared the CSI report in step 308, the following step may be the step of providing the CSI reporting on PUSCH to the eNB in step 310.

In FIG. 4, presenting method steps to be executed by the eNB, step 310 corresponds to step 408 of receiving CSI reporting on PUSCH.

The eNB may in this way receive information related to the quality of the downlink based on reference signals that can be transmitted by the eNB to the UE.

Figure 5:
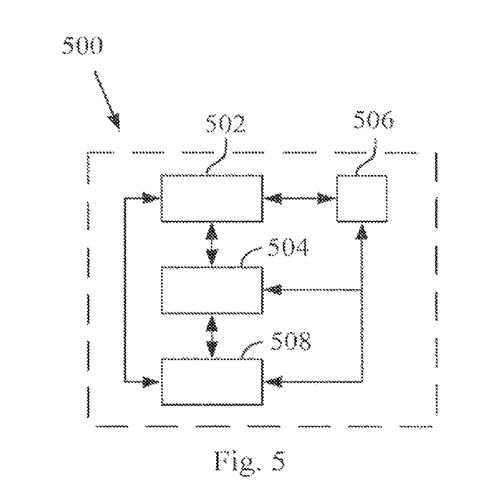
FIGS. 5 and 6 schematically illustrate network nodes of said wireless communication system.
Figure 6:
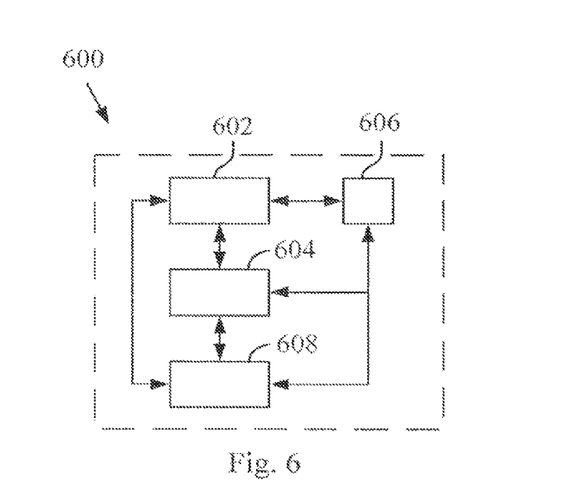

FIGS. 5 and 6 schematically illustrate network nodes in the form of a UE and an eNB base station, respectively.

According to at least some embodiments of the present invention, the UE 500 in FIG. 5 comprises a channel status indicator (CSI) determining unit 502, a CSI report preparation unit 504, and a transceiving unit 506. In addition the UE 500 can also comprise a control unit 508, adapted to control said units.

The channel status indicator (CSI) determining unit 502 may be adapted to determine the CSI of DL radio resources, such as the DL shared channel, based on reference symbols as transmitted by the eNB, corresponding to step 306 as illustrated in FIG. 3. The CSI report preparation unit 504 may be adapted to prepare the CSI report based on the determined CSI, as comprised in step 308 of FIG. 3.

The transceiving unit 506 is typically adapted to receive the UL scheduling grant for resources spanning over a plurality of sub frames, the step of which is illustrated in FIG. 3 by step 304. The transceiving unit is further adapted to provide the CSI reporting on the Physical Uplink Shared Channel (PUSCH), under control of the control unit 508, as presented in step 310 in FIG. 3. In addition, the transceiving unit 506 is also adapted to transmit the UL scheduling resource request, under the control of the control unit 508, to the eNB, once the UE needs a resource allocation to transmit data to the eNB.

According to at least some embodiments of the present invention, the eNB base station 600 as illustrated in FIG. 6 comprises a scheduling unit 602, a configuration unit 604, and a transceiving unit 606. In addition the eNB base station UE can also comprise a control unit 608, adapted to control said units.

The scheduling unit 602 may be adapted to allocate UL radio resources spanning over at least two sub frames by using an allocation method, corresponding to the step 404 as illustrated in FIG. 4. The configuration information to be transmitted to the UE for providing CSI reporting on PUSCH can be determined by the configuration unit 604, based on the resource allocation. The configuration unit 604 may be therefore adapted.

The transceiving unit 606 may be adapted to provide the determined configuration, or at least an indication thereof, to the UE, by transmitting an UL scheduling grant on Physical Downlink Control Channel (PDCCH), comprising the CSI reporting request, which is basically performed in method step 406 by the eNB, as illustrated in FIG. 4. The transceiving unit 606 can further be adapted to receive CSI reporting on Physical Uplink Shared Channel (PUSCH), as illustrated in FIG. 4. In addition, the transceiving unit 606 can also be arranged to receive the UL resource request, as presented in step 402 in FIG. 4, which request is initially transmitted by the UE, triggered by the presence of data to be transmitted to the eNB, and therefore the requirement of a scheduled resource allocation. Said eNB units may be controlled by the control unit 608.

The method steps of the embodiments of the present invention may alternatively be implemented by software executed by a processor in one or several network nodes, such as, but not limited to, a mobile terminal also called UE or mobile station, and/or a radio base station also called NodeB or eNodeB. It should also be noted that the invention is equally applicable both in the downlink as well as the uplink of a wireless system.

Means mentioned in the present description may be software means, hardware means or a combination thereof.

Any examples and terminology relating to 3GPP LTE standard being used herein should not be seen as limiting the scope of the invention, the methodology of which in principle can be applied to other systems as well, including for instance Wideband Code Division Multiple Access (WCDMA).

While various embodiments and variations of the present invention have been described above, it should be understood that they have been presented by way of example only, and not limitation. Thus, the breadth and scope of the present invention should not be limited by any of the above-described embodiments. Further, unless stated, none of the above embodiments are mutually exclusive. Thus, the present invention may include any combinations and/or integrations of the features of the various embodiments.

Additionally, while the methods described above are shown as a sequence of steps in flow-charts, this was done solely for the sake of illustration. Accordingly, it is contemplated that some steps may be added, some steps may be omitted and the order of the steps may be re-arranged.

It must be emphasized that the present invention can be varied in many ways. The presented embodiments of the present invention are only a few examples of the variety of embodiments that are comprised within the present invention.

The following advantages can be identified of at least some of the embodiments:

It is an advantage that the load on the Physical Uplink Control Channel (PUCCH) may be lowered by reporting CSI periodically on PUSCH instead of reporting CSI periodically on PUCCH.

Similarly, it is an advantage that the amount of grant signaling on the Physical Downlink Control Channel (PDCCH) is reduced.

It is advantageous that an increased coverage for PUSCH CSI reports is obtained in the case of resource allocation through TTI bundling.

The invention claimed is:

1. A method in a User Equipment (UE) for enabling providing reporting Channel Quality Indicator (CQI) on a Physical Uplink Shared Channel (PUSCH) to a base station, comprising the steps of:
   obtaining information of a resource allocation from the base station, for which the radio resources span over at least two sub frames;
   obtaining at least an indication of a request for reporting CQI on the PUSCH in a plurality of transmissions for which the allocation is valid; and
   reporting CQI on the PUSCH in a plurality of transmissions for which the allocation is valid.

2. The method according to claim 1, wherein uplink radio resources are allocated to the UE that are repeated periodically in time, or repeated consecutively in time.

3. The method according to claim 2, wherein the uplink radio resources are allocated to the UE by semi-persistent scheduling or Transmission Time Interval (TTI) bundling.

4. The method according to claim 3, wherein the reporting CQI comprises reporting an updated CQI for each semi-persistent UL transmission of a granted periodic allocation.

5. The method according to claim 3, wherein the reporting CQI comprises reporting an updated CQI for a configured subset of semi-persistent UL transmissions of a granted periodic allocation.

6. The method according to claim 3, wherein the reporting CQI comprises reporting an updated CQI for a static subset of semi-persistent UL transmissions of a granted periodic allocation.

7. The method according to claim 3, wherein the reporting CQI comprises repeating reporting the first CQI for all transmissions.

8. The method according to claim 3, wherein the reporting CQI comprises repeating reporting the first CQI for a configured subset of the transmissions.

9. The method according to claim 3, wherein the reporting CQI comprises repeating reporting the first CQI for a static subset of the transmissions, in the case of a TTI bundling resource allocation.

10. The method according to claim 1, wherein the obtaining information of the allocation method comprises obtaining a UL resource grant message on the Physical Downlink Control Channel (PDCCH).

11. The method according to claim 1, further comprising determining the CQI of radio resources based on the request, or said at least indication thereof, for reporting CQI.

12. The method according to claim 1, further comprising determining how to report CQI based on the information of a resource allocation and the at least an indication of a request for reporting CQI on the PUSCH, as obtained from the base station.

13. A user equipment (UE) configured for providing reporting Channel Quality Indicator (CQI) on a physical uplink data channel, said UE comprising:
   a transceiving unit adapted to receive at least an indication of a request for reporting CQI on a Physical Uplink Shared Channel (PUSCH); and
   a channel quality determining unit, adapted to determine the CQI of radio resources;
   wherein the transceiving unit further is adapted to transmit a CQI report on the PUSCH in a plurality of transmissions, to the base station;
   wherein the transceiving unit further is adapted to receive information of an allocation method from the base station, for which the radio resources span over at least two sub frames.

14. The UE according to claim 13, wherein uplink radio resources are allocated to the UE that are repeated periodically in time, or repeated consecutively in time.

15. The UE according to claim 14, wherein the uplink radio resources are allocated to the UE by semi-persistent scheduling or Transmission Time Interval (TTI) bundling.

16. The UE according to claim 15, wherein the CQI report is transmitted by transmitting an updated CQI for each semi-persistent UL transmission of a granted periodic allocation.

17. The UE according to claim 15, wherein the CQI report is transmitted by transmitting an updated CQI for a configured subset of semi-persistent UL transmissions of a granted periodic allocation.

18. The UE according to claim 15, wherein the CQI report is transmitted by transmitting an updated CQI for a static subset of semi-persistent UL transmissions of a granted periodic allocation.

19. The UE according to claim 15, wherein the CQI report is transmitted by repeatedly transmitting the first CQI for all transmissions.

20. The UE according to claim 15, wherein the CQI report is transmitted by repeatedly transmitting the first CQI for a configured subset of the transmissions.

21. The UE according to claim 15, wherein the CQI report is transmitted by repeatedly transmitted the first CQI for a static subset of the transmissions, in the case of a TTI bundling resource allocation.

22. The UE according to claim 13, wherein the transceiving unit further is adapted to receive information from the base station on how to provide CQI reporting on the PUSCH.

* * * * *

UNITED STATES PATENT AND TRADEMARK OFFICE
CERTIFICATE OF CORRECTION

| | | |
|---|---|---|
| PATENT NO. | : 9,526,087 B2 | |
| APPLICATION NO. | : 14/256412 | |
| DATED | : December 20, 2016 | |
| INVENTOR(S) | : Englund et al. | |

It is certified that error appears in the above-identified patent and that said Letters Patent is hereby corrected as shown below:

On the Title Page

In Item (72), under "Inventors", in Column 1, Line 4, delete "Sundyberg" and insert -- Sundbyberg --, therefor.

In the Specification

In Column 1, Line 5, delete "U.S.C." and insert -- U.S.C. § --, therefor.

In Column 4, Line 65, delete "reporting on" and insert -- on --, therefor.

In the Claims

In Column 13, Line 2, in Claim 21, delete "transmitted" and insert -- transmitting --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*